UNITED STATES PATENT OFFICE.

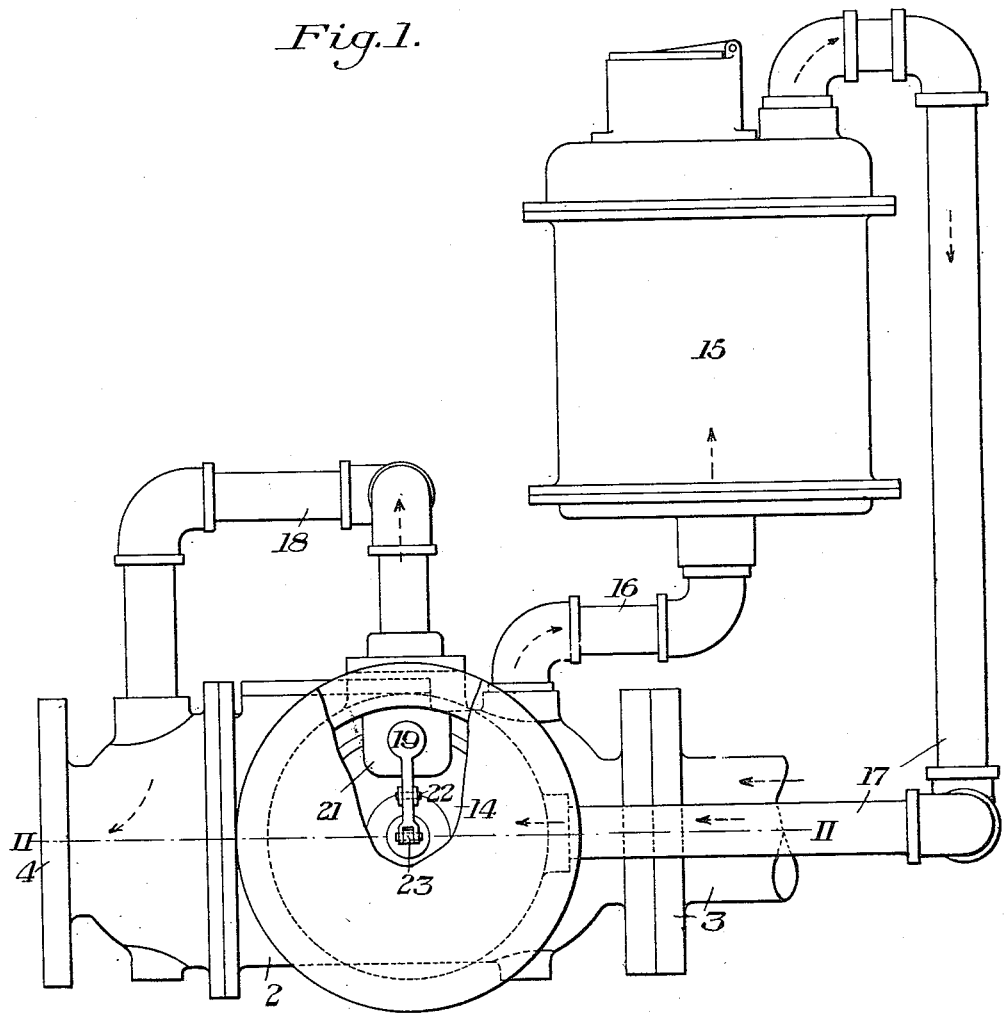

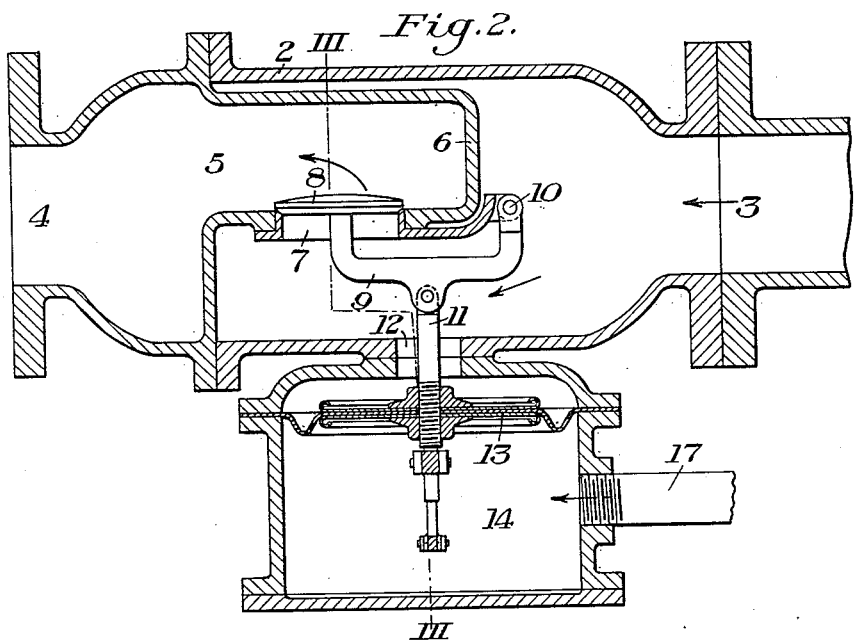
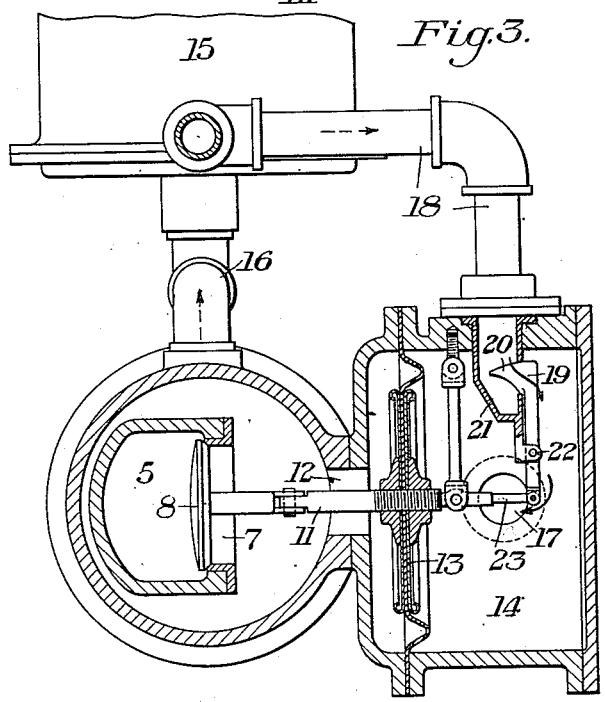

THOMAS B. WYLIE, OF PITTSBURGH, PENNSYLVANIA, ASSIGNOR TO EQUITABLE METER COMPANY, OF PITTSBURGH, PENNSYLVANIA, A CORPORATION OF PENNSYLVANIA.

PROPORTIONAL METER.

1,077,208.  Specification of Letters Patent.  Patented Oct. 28, 1913.

Application filed December 16, 1912. Serial No. 736,942.

*To all whom it may concern:*

Be it known that I, THOMAS B. WYLIE, a resident of Pittsburgh, in the county of Allegheny and State of Pennsylvania, have invented a new and useful Proportional Meter. of which the following is a full, clear, and exact description, reference being had to the accompanying drawings, forming part of this specification, in which—

Figure 1 is an elevation of a meter embodying my invention; Fig. 2 is a horizontal section on the line II—II of Fig. 1; and Fig. 3 is a section on the line III—III of Fig. 2.

My invention has relation to proportional meters which are employed for determining the volume of fluid passing through a conduit or main, wherein a portion of the fluid is passed through a tally meter.

The present invention is an improvement on the meter described and claimed in my Patent No. 956,953, of January 4th, 1898. In that patent, the valves for the measured and unmeasured currents of fluid are controlled by means of oppositely acting connecting pressure plates, one of said plates being a high pressure plate exposed to the direct inlet pressure of the fluid and forming the direct inlet valve; while the low pressure plate consists of a diaphragm connected to the high pressure plate and also having an actuating connection with the meter delivery valve. In these meters, the area of the opening for the meter delivery valve is made such that its ratio to the area of the opening of the direct inlet valve shall be equal to the ratio of the determined capacity of the tally meter to the volume of fluid passing to the direct delivery; so that under all degrees of opening of the direct delivery valve and the meter delivery valve, the proportionate delivery of the meter is constantly equal to the predetermined fraction of the supply flow with which the capacity of the tally meter accords. In the construction and arangement described in my said patent, the meter delivery valve chamber was within or in direct communication with the main delivery chamber; and as a consequence the valve and its chamber become more or less loaded with dust and dirt, deposited by the gas flowing through the direct inlet valve, and this interfered to some extent with the sensitiveness of the operation of such valve.

My present invention is designed to generally simplify and improve the construction of the meter; and more especially to provide an improved arrangement of the meter delivery valve whereby instead of being placed in or in communication with the main gas passage through the meter, it is placed in a chamber where it is exposed only to the gas which has passed through the tally meter.

Referring to the accompanying drawing, the numeral 2 designates a casing having the inlet connection 3 at one end and the outlet connection 4 at the opposite end. The direct delivery chamber 5 is separated from the inlet by a partition 6 having a horizontal portion formed with an inlet opening 7, which is controlled by the direct inlet valve 8, which forms the high pressure plate. This valve is seated to open in the direction of the flow of gas; and is mounted upon one arm of a bent lever 9. This lever has an upwardly extending arm at its opposite end, which is pivoted to the partition at 10. Connected to the central portion of the lever 9 is a rod 11, which extends through an opening 12, in the casing, and is connected to the diaphragm 13, which forms the low pressure plate. This diaphragm is placed within a chamber 14.

15 designates the tally meter, which is connected to the inlet end of the casing 2 by means of a pipe 16. From the tally meter, the fluid which has been measured therein passes through the pipe 17 into the diaphragm chamber 14. This diaphragm chamber 14 is connected at the inlet side of the diaphragm by a pipe 18 with the delivery chamber 5. The flow of gas from the diaphragm chamber to the pipe 18 is controlled by the meter delivery valve 19.

This valve 19 is a specially shaped needle valve having its needle portion 20 projecting through and controlling an opening in one side of a valve box 21, which opens to the pipe 18. The lever arm of the valve 19 is pivoted at 22 and its short arm is connected to an extension 23 of the rod 11, which connects the high and low pressure plates.

The operation is as follows: The fluid enters the meter at 3 and exerts opposing pressures on the valve 8 and diaphragm 13. Owing, however, to the larger area of the diaphragm 13, as compared with the area of the valve 8, the valve 8 will be held closed until such time as there is sufficient pressure at the opposite side of the diaphragm to overcome the pressure acting between the valve and diaphragm. In the meantime, fluid is passing through the pipe 16 to the tally meter and having passed through this meter, flows through the pipe 17 into the diaphragm chamber, where it builds up a pressure sufficient to actuate the diaphragm and rod 11 and open the valve 8. Fluid then passes through the direct admission valve into delivery chamber 5 and also by way of the tally meter, pipe 17, meter diaphragm, chamber 14, valve box 21, and pipe 18 to the delivery chamber.

The principle of operation of the device is the same as described in my said patent; but it will be observed that I have so arranged the meter delivery valve 19 that it is in no way exposed to the flow of unmeasured gas; but is only exposed to the measured gas which has already passed through the tally meter and has largely departed with its content of dust, dirt, etc. In this manner, the operation of the meter delivery valve is greatly improved and rendered more sensitive and reliable. It is obvious that any accumulation of dirt on this valve would materially affect the area of the gas opening around it. It will also be noted that I have in several respects changed the arrangement of the various chambers so as to simplify the connections between the high and low pressure plate and the connection to the meter delivery valve. The connection between the high and low pressure plates is herein shown as including a lever arm instead of being a direct thrust connection. This gives a very effective connection between the high and low pressure plates, simplifies the arrangement of the parts, and by reason of the fact that any desired amount of leverage can be obtained in the lever 9, enables the valve 8 to be made of any desired area.

I do not limit myself to the particular details of construction and arrangement of the several parts which I have herein shown and described, as it is obvious that they may be varied in many ways, without departing from the spirit and scope of my invention, as set forth in the appended claims.

What I claim is:—

1. In a proportional meter, the combination with a direct inlet valve arranged to open in the direction of the current, and acting as a high pressure plate acted upon by the entering fluid, of a tally meter connected to the inlet end of the meter apparatus, there being a passage leading from the tally meter delivery to another chamber, a low pressure plate in said chamber, a connection between the low and high pressure plates, and a meter delivery valve within the diaphragm chamber and having an actuating connection with the said pressure plates; substantially as described.

2. In a proportional meter, the combination with a direct inlet valve arranged to open in the direction of the current and acting as a high pressure plate acted upon by the entering fluid, a diaphragm chamber, a diaphragm therein acting as a low pressure plate and connected to the high pressure plate, a tally meter, there being a passage leading from the inlet side of the meter apparatus to the tally meter, there being also a passage leading from the delivery side of the tally meter to the diaphragm chamber, and another passage leading from the diaphragm chamber to the delivery chamber of the meter apparatus, the last named passage having therein a meter delivery valve for controlling the flow therethrough, and said valve being connected with the high and low pressure plates; substantially as described.

3. A proportional meter having oppositely acting pressure plates connected to each other, said plates controlling the valves for the measured and unmeasured currents of fluid, the valve for the measured current of fluid being situated in a chamber which is wholly external of and out of direct communication with the chamber for the unmeasured current of fluid; substantially as described.

4. In a proportional meter, the combination with a direct inlet valve arranged to open in the direction of the current, said valve acting as a pressure plate acted upon by the entering fluid, a diaphragm chamber adjacent to the inlet end of the meter apparatus, a diaphragm in said chamber and forming a low pressure plate, and a connection between the high and low pressure plates, said connection including a pivoted lever arm; substantially as described.

5. In a proportional meter, the combination with a direct inlet valve arranged to open in the direction of current, said valve acting as a pressure plate acted upon by the entering fluid, a diaphragm chamber containing a diaphragm which acts as a low pressure plate, a connection between said plates, a tally meter connected to the inlet end of the meter apparatus and having its delivery connected with the diaphragm chamber, there being a passage leading from the diaphragm chamber to the delivery side of the proportional meter, and a pivoted valve within the diaphragm chamber controlling the last named passage, said valve being connected to the high and low pressure plates; substantially as described.

In testimony whereof, I have hereunto set my hand.

THOMAS B. WYLIE.

Witnesses:
H. M. CORWIN,
GEO. H. PARMELEE.